United States Patent
Solyanik et al.

(10) Patent No.: US 7,533,099 B2
(45) Date of Patent: May 12, 2009

(54) COMPONENTIZED REMOTE USER INTERFACE

(75) Inventors: Sergey Solyanik Solyanik, Seattle, WA (US); James Christopher Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 11/002,173

(22) Filed: Dec. 2, 2004

(65) Prior Publication Data

US 2006/0123015 A1 Jun. 8, 2006

(51) Int. Cl.
*G06F 7/00* (2006.01)
*G06F 17/30* (2006.01)

(52) U.S. Cl. .................... 707/10; 707/1; 707/100; 707/200; 709/220; 709/223

(58) Field of Classification Search .............. 707/1, 707/10, 100, 200; 709/220, 223
See application file for complete search history.

(56) References Cited

U.S. PATENT DOCUMENTS

| | | | | |
|---|---|---|---|---|
| 5,838,907 A * | 11/1998 | Hansen | ................ | 709/220 |
| 6,760,755 B1 * | 7/2004 | Brackett | ................ | 709/214 |
| 6,978,301 B2 * | 12/2005 | Tindal | ................ | 709/223 |
| 7,349,916 B2 * | 3/2008 | Simons | ................ | 707/102 |
| 2002/0069275 A1 * | 6/2002 | Tindal | ................ | 709/223 |

OTHER PUBLICATIONS

Cheung et al., "Automatic device configuration and data validation through mobile communication", Communications, Computers and signal Processing, 2003. PACRIM. 2003 IEEE Pacific Rim Conference on (0-7803-7978-0) Aug. 28-30, 2003. vol. 1; p. 284 Download: http://ieeexplore.ieee.org/stamp/stamp.jsp?arnumber=01235773.*
Bob Olson, "Managing configuration: Command and control", Network Magazine; San Francisco (1539-8137) Jul. 2003. vol. 18,Iss. 7;p. 46. Download: http://proquest.umi.com/pqdlink?vinst=PROD &fmt=6&startpage=-1&ver=1&vname=PQD&RQT=309 &did=370885381&exp=12-14-2013&scaling=FULL&vtype=PQD &rqt=309&TS=1229377106&clientId=196499.*

* cited by examiner

*Primary Examiner*—John E Breene
*Assistant Examiner*—Hares Jami
(74) *Attorney, Agent, or Firm*—Woodcock Washburn LLP

(57) ABSTRACT

Systems and methods for providing a componentized remote user interface are disclosed. Such user interfaces are particularly suitable for use in remote configuration of a device, such as a headless device, that is in network communication with a computer. The user interface may be a web page rendered from an HTML file that defines the web page and a separate file that includes script for associating a value with a variable parameter. The HTML file may include a reference to the variable parameter and incorporate the other file therein by reference. When the web page is rendered, the device parses the HTML file to identify the file incorporated therein by reference and substitutes the parameter value provided in the file for the variable included in the HTML file. Thus, the rendered web page may include the actual value of the parameter, and the HTML file need not have the actual value hard-coded therein.

6 Claims, 7 Drawing Sheets

310

```
<TITLE>Config Page </TITLE>
<BODY>
```
311 → `<P>IPaddress: 217.160.219.11</P>`
312 → `<P>subnet: 255.255.255.0</P>`
313 → `<P>gateway: 217.160.219.1</P>`
314 → `<P>name:device1</P>`

. . .

`</BODY>`

FIG. 2

```
<script src="NETWORK" language="javascript"></script>
<script src="LANG" language="javascript"></script>
<html>
<script>
        document.write(g_LANG_Config + "<BR>");
        document.write("<P>" + g_LANG_TextIPAddr + ":"
                               + g_NETWORK_IPAddr + "</P>");
        document.write("<P>" + g_LANG_TextSubnet + ":"
                               + g_NETWORK_Subnet + "</P>");
        document.write("<P>" + g_LANG_TextGateway + ":"
                               + g_NETWORK_Gateway + "</P>");
        document.write("<P>" + g_LANG_TextName + ":"
                               + g_NETWORK_Name + "</P>");
</script>
</html>
```

FIG. 5

```
<script language="javascript">
var g_NETWORK_Name = "device1";
var g_NETWORK_IPAddr = "217.160.219.11";
var g_NETWORK_Subnet = "255.255.255.0";
var g_NETWORK_Gateway = "217.160.219.1";
var g_LANG_Config = "Configuration Page";
var g_LANG_TextIPAddr = "IP Address";
var g_LANG_TextSubnet = "Subnet";
var g_LANG_TextGateway = "Gateway";
var g_LANG_TextName = "Name";
</script>
```

FIG. 6

COMPONENTIZED REMOTE USER INTERFACE

FIELD OF THE INVENTION

The invention relates generally to user interfaces to remote devices. More particularly, the invention relates to componentized user interfaces to remote devices via which such devices may be remotely configured.

BACKGROUND OF THE INVENTION

A computer may communicate with remote devices such as residential gateways, network attached storage devices, routers, print servers, media servers, etc. Such devices typically require configuration, but they typically do not have a physical interface (e.g., monitor, keyboard, mouse) to facilitate such configuration. Accordingly, such devices may be referred to as "headless" devices. To configure such a headless device, the computer may be communicatively coupled to the device, typically via a local-area network (LAN), so that the user is enabled to communicate with the device. Thus, from a user interface presented at the computer, the user can typically access and modify configuration information on the remote device. Such configuration information may include the name of the device or parameter information such as an Internet Protocol (IP) address associated with the device, for example.

Typically, configuration information is sent to the computer in the form of an HTML file. A browser on the computer renders the web page from the HTML file, and thereby presents the information to the user in a desired format (e.g., layout and appearance) and in a language that the user is expected to understand (e.g., English). The web page serves as a remote user interface, i.e., an interface to the remote device, via which the user may, for example, remotely change the configuration information associated with the device.

FIG. 1 is a block diagram of an example embodiment of a prior art system 200 for providing a remote user interface. The system 200 may include one or more computers 210, which may be desktop computers, laptop computers, etc., and one or more network devices 230, which may be headless devices such as described above.

The device(s) 230 may be communicatively coupled to the computer 210 via a network 220, which may be a LAN or a wide-area network (WAN) such as the Internet, for example. The device(s) 230 may be in communication with the computer 210 through a direct connection with the computer 210, with or without being communicatively coupled to the computer 210 via the network.

The computer 210 may be used to provide the user with a user interface via which, for example, the user can remotely configure the device 230. The computer 210 may include a physical user interface, such as a display and mouse or keyboard, for example, and browser software that may be executed on the computer 210.

The device 230 may have stored thereon a file 232 that enables a browser to render a web page. The file 232 may be in a mark-up language, such as HTML, for example. The web page may, for example, enable a user of the computer 210 to access and modify configuration information on the remote device 230. To configure the device 230, the user of the computer 210 launches the browser on the computer 210 and connects, via the network 220, to the device 230. The computer retrieves the HTML file from the device 230 and renders the web page defined by the HTML file.

The HTML file 232 includes one or more predefined or "hard-coded" parameter values 234. The HTML file 232 also includes HTML code, scripts, images, objects, and the like (not shown), that define the layout and appearance or "skin" 236 of the web page. The HTML file 232 may include such code, scripts, images, objects, etc., explicitly, or it may include references to other files that include such code, scripts, images, objects, etc. When the web page is rendered, the hard-coded parameter values 234 appear within the web page in accordance with the skin 236.

An example of such an HTML file 310 is depicted in FIG. 2. As shown, a first parameter 311 may be defined as having a value of "IP address: 217.160.219.11." Similarly, a second parameter 312 may be defined as having a value of "subnet: 255.255.255.0." A third parameter 313 may be defined as having a value of "gateway: 217.160.219.1." A fourth parameter 314 may be defined as having a value of "name: device1." When the web page is rendered, these values appear within the web page in accordance with the skin.

Such an HTML file may be generated by the device's web browser, either by running an ISAPI plug-in, CGI script, or an ASP page. Usually, the code that generates such an HTML file is produced by one or more developers or programmers of the device. To produce the HTML file, the developers must access configuration data on the device such as, for example, values associated with certain parameters, such as an IP address, for example.

The developers also need to know the desired layout and appearance, or "skin," of the web page presented to the user via a display on the remote computer. In some instances, the device manufacturer or distributor may want the rendered web page to have different skins under different circumstances. Further, the configuration software may be sold to different vendors, each of which may want the ability to reskin so that the software takes on the specific look and feel they want.

Additionally, the developers need to know the geographic location of intended users so that any displays will be in a language understood by the users. For example, if the device is intended for use in a certain country, then the rendered configuration page should be in a language understood in that country. Typically, all of these factors will be accounted for in the logic or coding provided in the application or service responsible for generating the HTML file before the device is shipped to the end-user. Therefore, all of the information related to these factors typically must be known by the developers when developing the default HTML file.

None of the developers, however, may have all of the information because, for example, there may be one developer involved with developing the skin for the configuration page and a separate developer involved with the parameter data for the device itself. There may be a third developer involved in localizing the web page. It would e desirable, therefore, if methodologies were available to provide remote user interfaces without the need for hard-coding parameter values.

SUMMARY OF THE INVENTION

The invention is directed to systems and methods for providing a componentized remote user interface that is particularly suitable for remote configuration of a headless device. The invention provides flexibility in the development of such user interfaces, which may be rendered as web pages on computers associated with such remote devices. The invention enables a developer to focus on web page skinning, for example, without requiring any knowledge by the developer of ways to retrieve parametric data associated with the device, or localization information associated with the intended user of the device. Rather, the skin developer can develop an HTML file that references certain variables and incorporates by reference certain files that associate values with the variables. Such variables may be associated with configuration and localization of the device.

A second developer focused on the device's parametric data but uninterested in the appearance and layout of the web page may develop one or more files that are separate from the HTML file and associated specific values with the variable parameters (e.g., a device name, an IP address, etc.). A third developer focused on localization but uninterested in skinning or the specific parameter values to be associated with the device may develop one or more files that include localization information to be included in the rendered web page.

When the web page is rendered, the values provided in the referenced files are pulled into the HTML file and substituted for the variables. In this way, the web page may be rendered with all the desired data, localization information, and skinning, without requiring all the desired data, localization information, and skinning to be hard-coded into a single HTML file.

A user of a computer in communication with the device may change the configuration data on the device by providing such configuration data via the web page. When the configuration data is changed, the device will update the configuration state. This state will be used in rendering the web page the next time the user does so. Because the configuration data in the form of name/value pairs may be abstracted from the user interface, such pairs can be retrieved by an application running on a client PC, for example, and stored as a backup of the configuration state of the device.

BRIEF DESCRIPTION OF THE DRAWINGS

The foregoing summary, as well as the following detailed description of illustrative embodiments, is better understood when read in conjunction with the appended drawings. For the purpose of illustrating the invention, there are shown in the drawings example embodiments of the invention. It should be understood, however, that the invention is not limited to the specific embodiments disclosed.

FIG. 2 is an example of an excerpt from a prior art HTML file for defining a web page.

FIGS. 5 and 6 provide examples of modules that may be used to provide a componentized user interface in accordance with the invention.

DETAILED DESCRIPTION OF ILLUSTRATIVE EMBODIMENTS

Example Computing Environment

Figure 1:
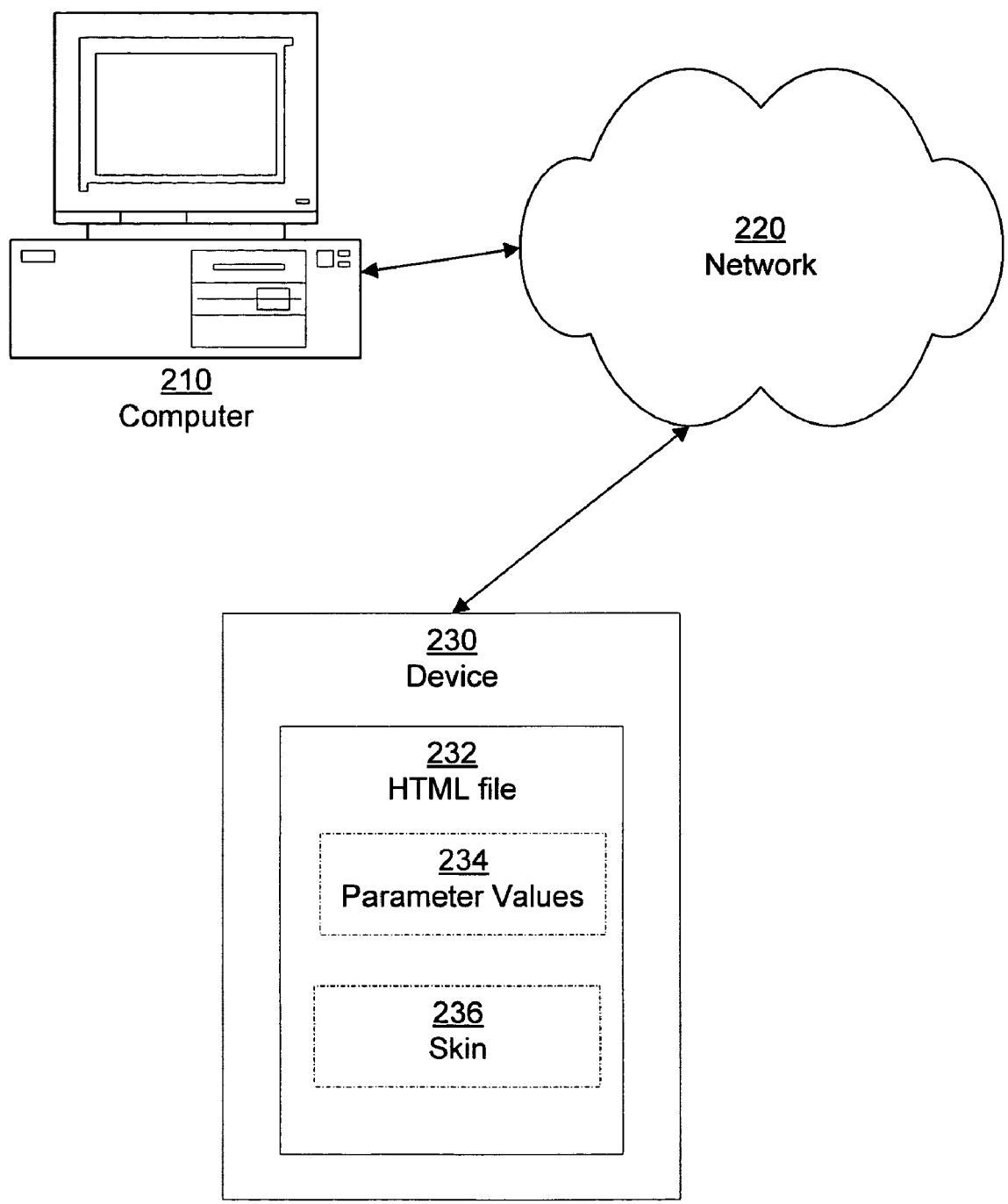
FIG. 1 is a block diagram of an example embodiment of a typical prior art system for providing a remote user interface.
Figure 3:
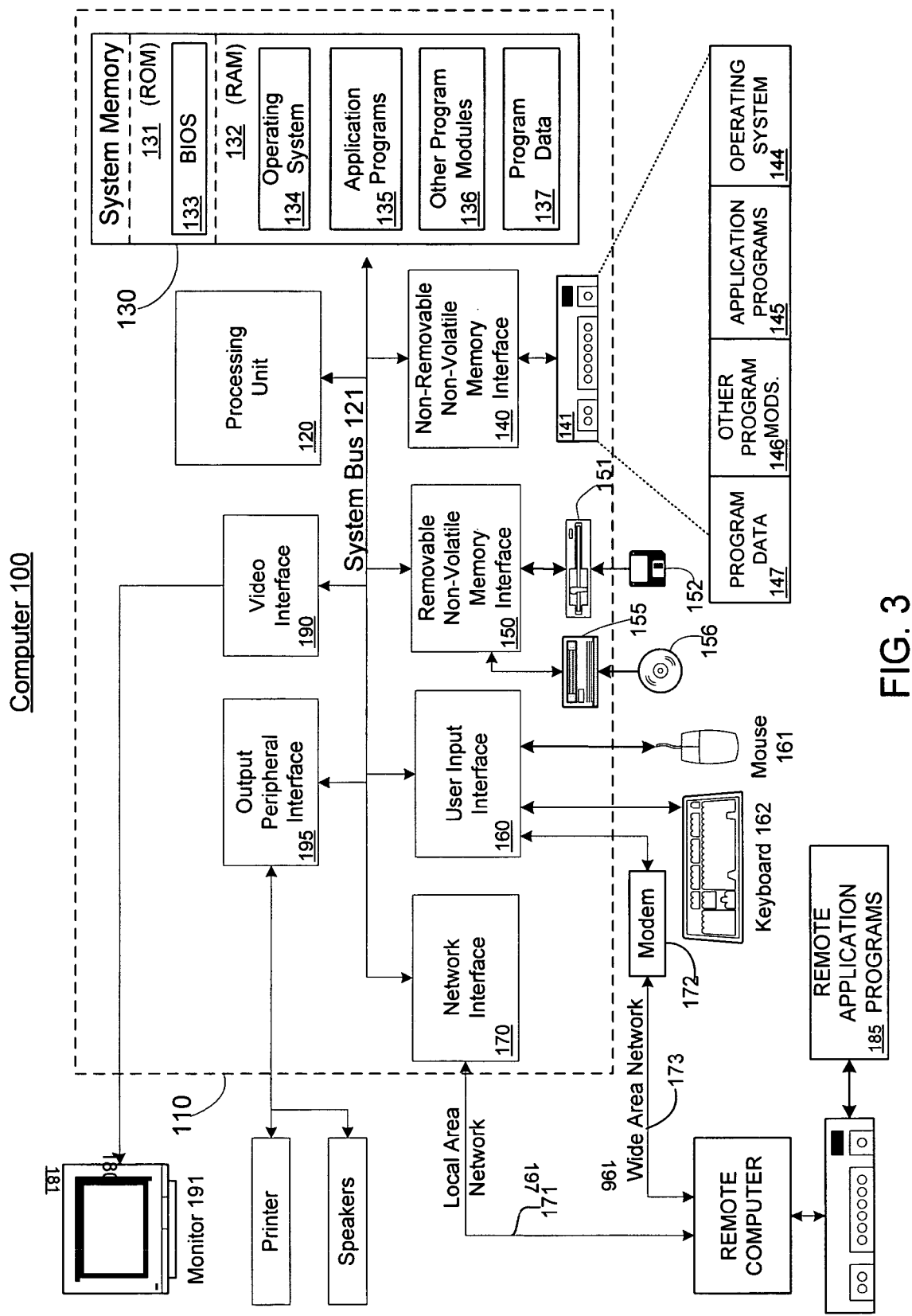
FIG. 3 is a block diagram showing an example computing environment in which aspects of the invention may be implemented.

FIG. 3 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 3 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3 provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Componentized Remote User Interface

Figure 4:
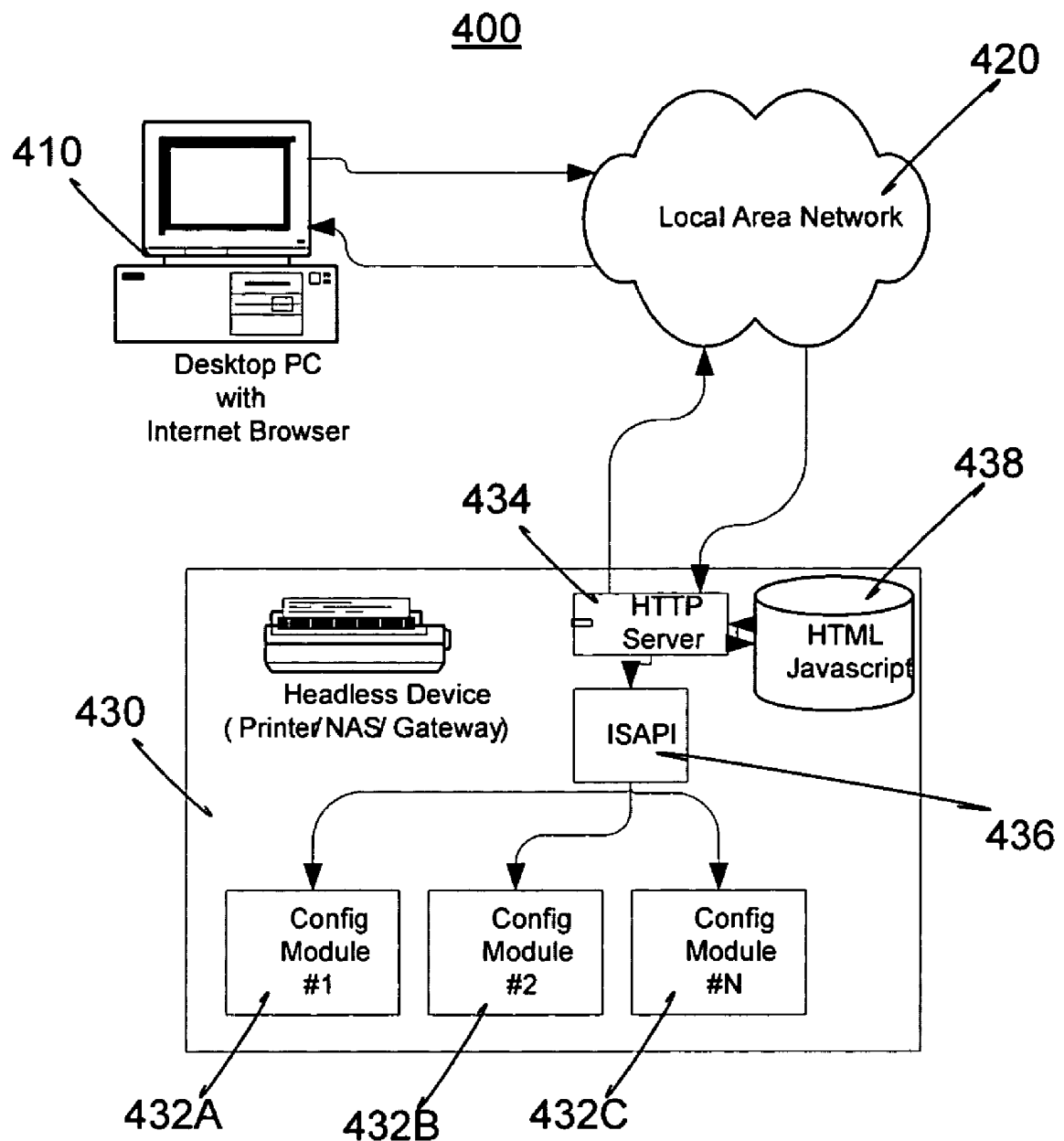
FIG. 4 is a block diagram of an example embodiment of a system for providing a remote user interface in accordance with the invention.

FIG. 4 is a block diagram of an example embodiment of a system for providing a componentized remote user interface in accordance with the invention. The system 400 may include one or more computers 410, which may be desktop computers, laptop computers, etc., and one or more remote network devices 430.

The remote device(s) 430 may be communicatively coupled to the computer 410 via a network 420, which may be a LAN or a wide-area network (WAN) such as the Internet, for example. The device(s) 430 may be in communication with the computer 410 through a direct connection with the computer 410, with or without being communicatively coupled to the computer 410 via the network.

The computer 410 may be used to provide the user with a user interface via which, for example, the user can remotely configure the device 430. The computer 410 may include a physical user interface, such as a display and mouse or keyboard, for example, and browser software that may be executed on the computer 410.

The remote device 430 may be a headless device such as a residential gateway, network attached storage device, router, print server, media server, etc. To configure the remote device 430, the user of the computer 410 may launch the browser on the computer 410 and connect, via the network 420, to the remote device 430. The computer 410 may retrieve one or more HTML files, for example, from the device 430 and render a web page via which the user of the computer 410 may configure the remote device.

The remote device 430 may include an HTTP server 434, which may be a software process that handles low level protocol negotiation with the browser on the computer 410, an internet server application programming interface ("ISAPI") 436, which may be an interface used to program to the HTTP server, and an HTML/Javascript data store 438, which may contain files used to generate a desired experience, such as files for localization and presentation.

The remote device 430 may also include one or more configuration modules 432A-C. Examples of such configuration modules are depicted in FIGS. 5 and 6. A first such module, which may be a default HTML file, may include a reference to one or more other modules. An example of such a default HTML file is depicted in FIG. 5. As shown, the default HTML file may include script for including the referenced modules NETWORK and LANG.

As shown in FIG. 6, the referenced modules may include one or more name/value pairs. For example, the module NETWORK may include values associated with parameters named Name, IPAddr, Subnet, and Gateway. Similarly, the module LANG may include values associated with parameters named Config, TextIPAddr, TextSubnet, TextGateway, and TextName. It should be understood that, in general, the parameters could be any parameters, with any names, and that the values associated with the parameters could be any values. It should also be understood that the referenced modules (e.g., NETWORK and LANG) need not exist on the remote device. The referenced modules could be generated by software running on the device when the default HTML file is requested by the browser running on the client computer.

When the web page is rendered on the client computer, the result from the instruction "document.write(g_LANG_Config+"<BR>")" would be "Configuration Page." By altering the text in LANG module, the text "Configuration Page" could appear in any desired language. Similarly, the result from the instruction "document.write("<P>"+g_LANG_TextIPAddr+":"+g_NETWORK_IPAddr+"</P>")" would be "IP Address: 217.160.219.11." The result from the instruction "document.write("<P>"+g_LANG_TextSubnet+ ":"+g_ NETWORK_Subnet+"</P>") would be "Subnet: 255.255.255.0." The result from the instruction "document.write("<P>"+g_LANG_TextGateway+":"+g_NETWORK_Gateway+"</P>") would be "Gateway: 217.160.219.1." The result from the instruction "document.write("<P>"+ g_LANG_TextName+":"+g_NETWORK_Name+"</P>") would be "Name: device1." By changing the values in the referenced modules, the appearance of the web page may be changed as desired.

Thus, the web page rendered from the files depicted in FIGS. 5 and 6 may be identical to the web page rendered from the file depicted in FIG. 2. The use of variable parameters and references to external files that include specific data associated with the variable parameters, however, provides additional flexibility during development of the web page.

A user of the computer 410 can use such a componentized remote user interface to set or change one or more aspects of the configuration of the device 430. For example, if the user wants to change the IP address of the device (e.g., from the default value to a user-supplied value, or from a previously-supplied value to a new value), then the user can overwrite the IP address presented via the web page. Preferably, the web page also includes an "update" button that the user can select (e.g., by clicking with the mouse). Upon selection of the update button, the configuration state of the device is modified to reflect the updated IP address.

It should be understood from the foregoing description that a componentized user interface enables a developer writing the HTML code that defines the web page to focus only on the "skin" of the web page. Specific parametric data, such as IP addresses, for example, may be included as variable parameters. Similarly, "localization" information, such as the language in which certain terms should be presented, may also be included as one or more variables. The language itself may be included as a variable parameter. Thus, a skin developer may develop the HTML file irrespective of the specific parameters or localization information, a localization developer can develop the localization information independently of the skin developer, and a developer with knowledge of the specific data values may produce files to provide those values independently of the skin developer and the localization developer.

Figure 7:
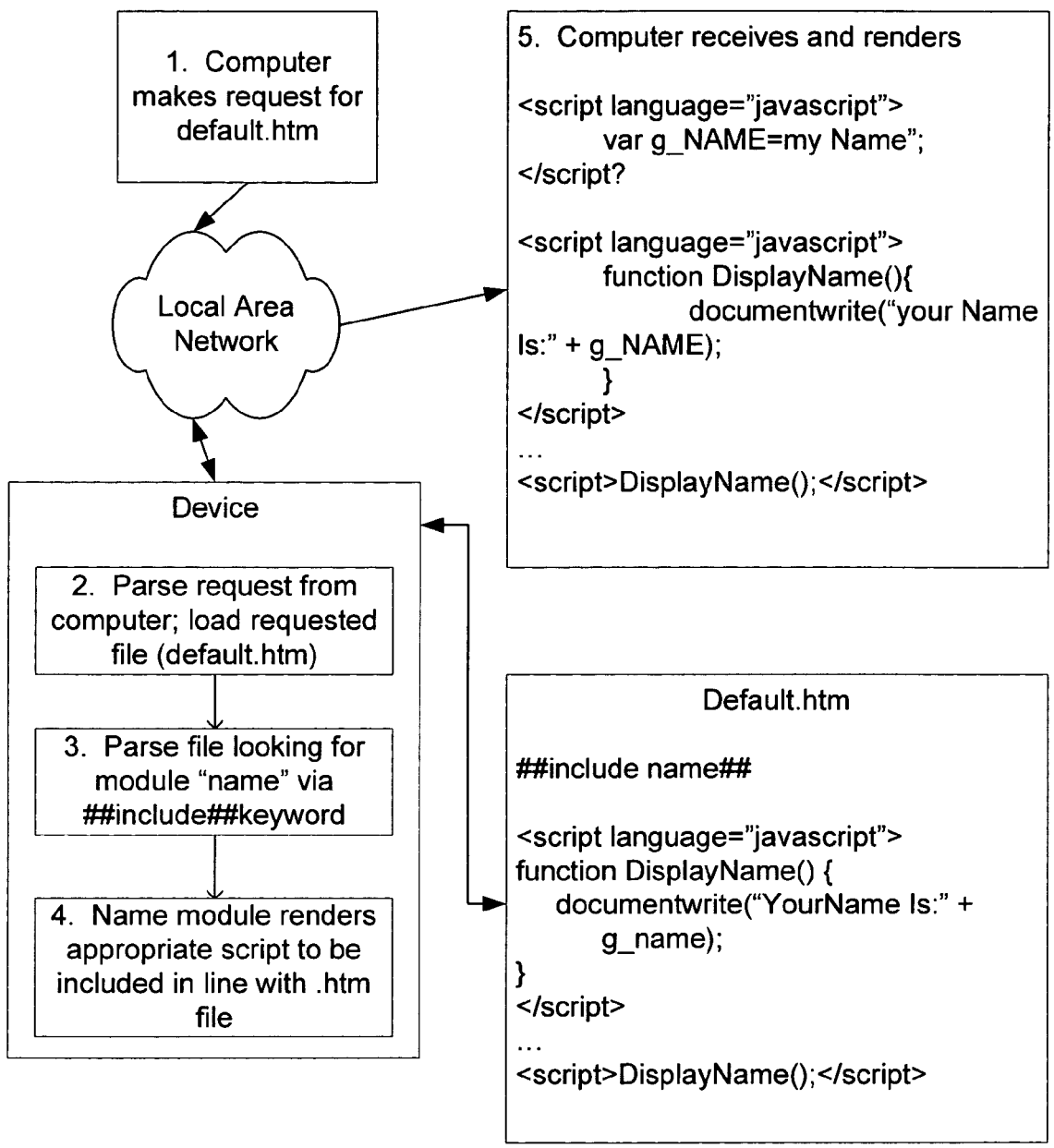
FIGS. 7 and 8 are functional block diagrams of example embodiments of system according to the invention for providing componentized remote user interfaces.

FIG. 7 is a functional block diagram of an example embodiment of a system for providing a componentized remote user interface in accordance with the invention. At step 1, the browser on the computer may request a default HTML file, which is depicted in FIG. 7 as "default.htm." This request may be communicated to the device via a local area network, for example.

At step 2, a control routine on the device may parse the request, and locate and load default.htm. Alternatively, default.htm may be loaded from an insertable storage medium, such as a compact disc, for example. The use of an insertable storage medium may aide in configuration page development by allowing for dynamic swapping of pages as they are constructed.

At step 3, a control routine on the device may parse default.htm and determine that default.htm includes an include directive that references an external module "name." At step 4, the name module may render appropriate script to be incorporated into the appropriate line in default.htm. The computer receives the name module at step 5 and renders the information through use of a script.

As in the example shown in FIG. 7, the script language may be "javascript" containing a variable called "name." It should be understood, however, that any script language may be used. The script language results in a display on the computer such as "Your Name is" followed by the name for the device stored in the include file "name."

Because simple script is returned from the name module, no server-side rendering or ordering of the configuration page is performed or necessary. This may allow for quicker development as compilation and linking may not be required steps.

Figure 8:
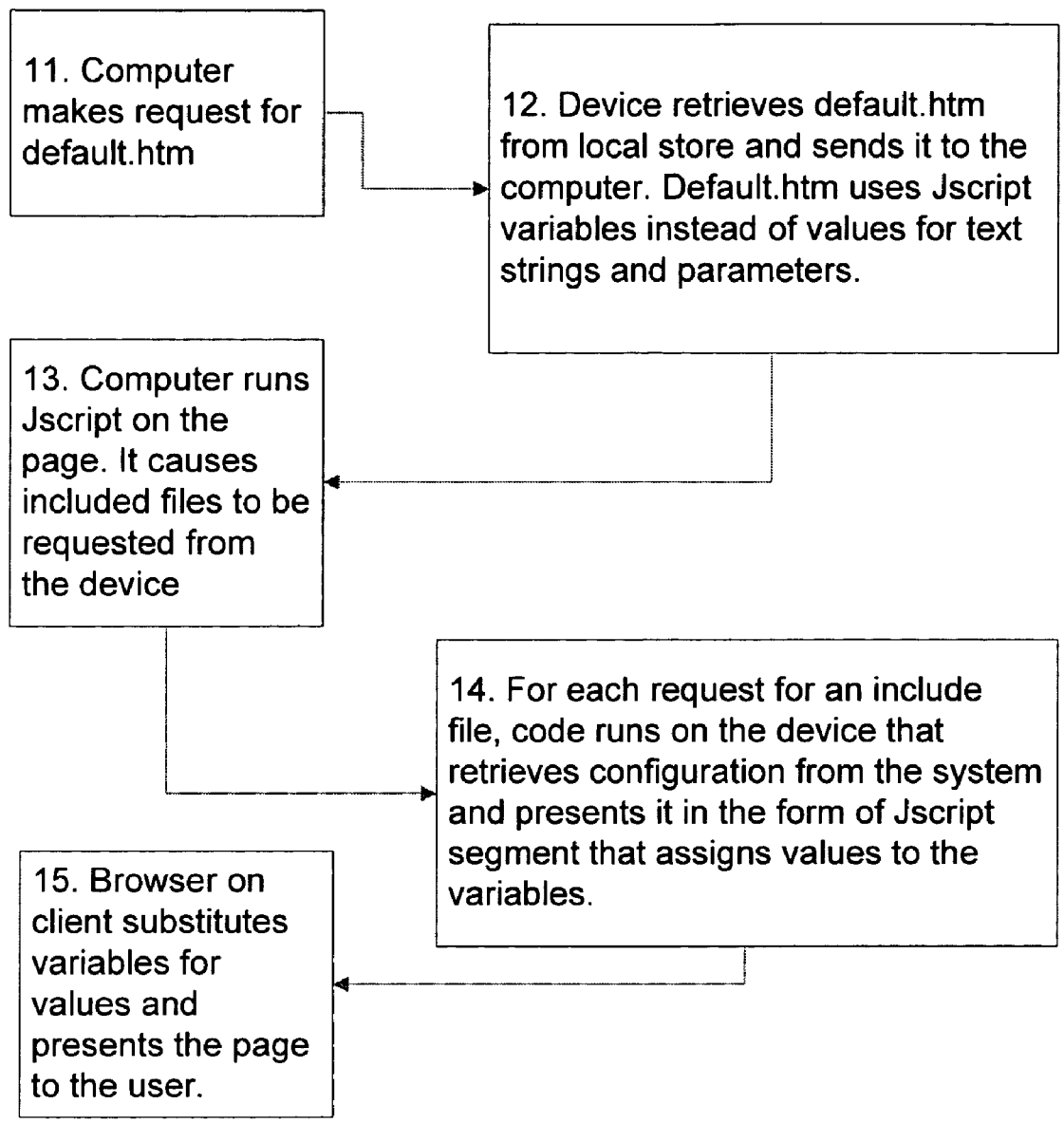

FIG. 8 is a functional block diagram of an example embodiment of a client-based implementation for providing a componentized remote user interface in accordance with the invention. At step 11, the computer requests "default.htm" from the device. At step 12, the device retrieves default.htm from a local store, and sends it to the computer. As described above in connection with FIG. 5, default.htm may use Javascript variables, for example, instead of values for text strings and parameters. At step 13, the computer runs the Javascript on the page, which causes any included files to be requested from the device. At step 14, for each request for an include file, code runs on the device that retrieves configuration from the system and presents it in the form of a Javascript segment that assigns values to the variables. At step 15, the browser on the client substitutes variables for values and presents the page to the user.

A componentized remote user interface according to the invention may also be used to restore a previous configuration on a remote device. Typically, a user backs-up one or more files that represent a current configuration state of the device before implementing a change to the configuration. If, for any reason, the user wishes to return to the previous configuration, the user uploads the backed-up data, which is consumed by a process on the device that parses this data to restore the previous configuration. It is well-known, however, that when an aspect of a system's configuration is changed, the change may cause a "ripple effect," wherein changes to other configuration states occur as a result of the requested configuration change. The user, however, might not know which files have been affected by the change as it propagates through the system.

Rather than trying to back up all files connected with the configuration change, a componentized remote user interface according to the invention allows the developer of the device to create a simpler backup application that comes in two stages. First, to backup data, the user goes to the page that includes all configuration parameters (all .h files) in the system. It then records the data in the form of post commands that can be used to write configuration back to the device as if user were to press the "Update" button. This page could then be stored locally on the computer, and executed when the restore action is desired.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Though the present invention has been described in connection with the preferred embodiments of the various figures, it is to be understood that other embodiments may be used or modifications and additions may be made to the described embodiments for performing the same function of the present invention without deviating therefrom. In no way is the present invention limited to the examples provided herein. Therefore, the present invention should not be limited to any single embodiment, but rather should be construed in breadth and scope in accordance with the appended claims.

What is claimed:

1. A method for configuring a remote device, the method comprising:

storing on the remote device to be configured, a first file that includes a variable parameter and a value associated with and corresponding to the variable parameter and a second file that includes a reference to the variable parameter of the first file and that incorporates the first file therein by reference, the first file and the second file implemented to configure the remote device;

coupling the remote device to a host computer via a network;

receiving, by the host computer, the first file and the second file from the remote device;

rendering a web page on the host computer based on the received first file and the received second file by obtaining the value corresponding to the variable parameter from the first file and displaying the value according to the second file;

receiving, by the host computer, a user-provided value associated with the variable parameter via the rendered web page;

modifying, by the host computer, the received first file to include the variable parameter and the user-provided value associated with and corresponding to the variable parameter;

storing the modified first file with the user-provided value on the remote device, the user-provided value comprising a configuration parameter to update the configuration state of the remote device;

retrieving, by the remote device, the user-provided value from within the modified first file stored thereat; and employing by the remote device, the retrieved user-provided value to establish the updated configuration state of the remote device.

2. The method of claim 1, further comprising:
modifying the first file to associate the user-provided value with the variable parameter.

3. The method of claim 2, further comprising:
storing the modified first file on the remote device.

4. The method of claim 2, further comprising:
storing the modified first file on the host computer.

5. The method of claim 4, further comprising:
receiving a second user-provided value associated with the parameter via the web page; and
modifying the modified first file to associate the second user-provided value with the variable parameter.

6. The method of claim 5, further comprising:
downloading the modified first file onto the host computer to replace the twice-modified first file;
rendering the web page on the host computer using the modified first file; and
restoring the first user-provided value on the host computer in place of the second user-provided value.

* * * * *